US007824088B2

(12) United States Patent
Iwasaki

(10) Patent No.: US 7,824,088 B2
(45) Date of Patent: Nov. 2, 2010

(54) VEHICLE LIGHTING APPARATUS

(75) Inventor: Kazunori Iwasaki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 181 days.

(21) Appl. No.: 11/798,637

(22) Filed: May 15, 2007

(65) Prior Publication Data

US 2007/0268717 A1 Nov. 22, 2007

(30) Foreign Application Priority Data

May 17, 2006 (JP) ............................ 2006-138177

(51) Int. Cl.

*B60Q 1/00* (2006.01)
*F21V 11/00* (2006.01)
*F21V 7/00* (2006.01)

(52) U.S. Cl. ....................... 362/538; 362/539; 362/517; 362/800

(58) Field of Classification Search ................. 362/800, 362/296–303, 346, 506, 507, 516, 517, 518, 362/538, 539, 545, 547, 548
See application file for complete search history.

(56) References Cited

U.S. PATENT DOCUMENTS

| | | | | |
|---|---|---|---|---|
| 3,818,265 | A * | 6/1974 | Hicks et al. | 315/82 |
| 5,414,601 | A * | 5/1995 | Davenport et al. | 362/538 |
| 6,367,954 | B1 * | 4/2002 | Futami | 362/297 |
| 6,966,675 | B2 * | 11/2005 | Albou | 362/298 |
| 7,201,507 | B2 * | 4/2007 | Takeda et al. | 362/545 |
| 7,207,705 | B2 * | 4/2007 | Ishida | 362/517 |
| 7,261,448 | B2 * | 8/2007 | Ishida et al. | 362/507 |
| 7,316,495 | B2 * | 1/2008 | Watanabe et al. | 362/545 |
| 7,387,416 | B2 * | 6/2008 | Tsukamoto et al. | 362/518 |

FOREIGN PATENT DOCUMENTS

| | | | | |
|---|---|---|---|---|
| JP | 4-118504 | U | | 10/1992 |
| JP | 07-273016 | A | | 10/1995 |
| JP | 2002-163912 | A | | 6/2002 |
| JP | 2002163912 | A | * | 6/2002 |
| JP | 2003-229006 | A | | 8/2003 |
| JP | 2005-228715 | | | 8/2005 |
| JP | 2006-107955 | | | 4/2006 |
| WO | WO 2005/010430 | A1 | | 2/2005 |

* cited by examiner

*Primary Examiner*—Jong-Suk (James) Lee
*Assistant Examiner*—David R Crowe
(74) *Attorney, Agent, or Firm*—Foley & Lardner LLP

(57) ABSTRACT

A planar reflection surface is arranged between a projection lens and a lens focal point of the projection lens. The lens focal point exists as a pseudo lens focal point at a symmetric position with respect to the planar reflection surface. A horizontal optical axis exists as a vertical pseudo optical axis that intersects at right angles with the horizontal optical axis.

3 Claims, 4 Drawing Sheets

VEHICLE LIGHTING APPARATUS

CROSS-REFERENCE TO RELATED APPLICATIONS

The present document incorporates by reference the entire contents of Japanese priority document, 2006-138177 filed in Japan on May 17, 2006.

BACKGROUND OF THE INVENTION

1. Field of the Invention

The present invention relates to a projector-type vehicle lighting apparatus that employs a semiconductor light source such as a light emitting diode (LED) as a light source, and more particularly, to a vertical projector-type vehicle lighting apparatus with a capability of decreasing a depth dimension in the horizontal direction.

2. Description of the Related Art

Vehicle lighting apparatuses of this type are already known (see, for example, Japanese Patent Application Laid-Open No. 2006-107955). In a conventional vehicle lighting apparatus disclosed in Japanese Patent Application Laid-Open No. 2006-107955, a light from an LED of a light source is reflected by a reflector and a reflected light is emitted forward via a convex lens. The reflector has an elliptical reflection surface. The LED is located at or in the vicinity of a first focal point of the elliptical reflection surface. A second focal point of the elliptical reflection surface is located at or in the vicinity of a focal point of the convex lens. The light axis of the elliptical reflection surface and the light axis of the convex lens coincide with each other, forming a horizontal surface. The LED, the reflector, and the convex lens are arranged in a horizontal direction. The conventional vehicle lighting apparatus has a large depth dimension in the horizontal direction because the light axis of the elliptical reflection surface and the light axis of the convex lens are forms the horizontal surface, and the LED, the reflector, and the convex lens are arranged in the horizontal direction.

Vehicle lighting apparatuses (vehicle headlamps) in which a longitudinal length is shortened (the depth dimension in the horizontal direction is decreased) using a planar reflection surface are also known (see, for example, Japanese Patent Application Laid-Open No. 2005-228715). a conventional vehicle lighting apparatus disclosed in Japanese Patent Application Laid-Open No. 2005-228715 uses a discharge bulb as a light source, instead of a semiconductor light source such as an LED. Moreover, in this conventional vehicle lighting apparatus, the light axis of a projection lens extends in an anteroposterior direction of a vehicle (the horizontal direction), and the light axis of the reflector is configured to intersect with the light axis of the projection lens, by which the reflected light from the reflector is reflected to the projection lens side by a planar reflection surface. Therefore, for this conventional vehicle lighting apparatus, since the discharge bulb, the reflector, the projection lens, and the planar reflection surface are arranged in the vehicle longitudinal direction, the depth dimension in the horizontal direction is great like the above-described vehicle lighting apparatuses.

Thus, the conventional vehicle lighting apparatuses have a problem in that the depth dimension in the horizontal direction is great.

SUMMARY OF THE INVENTION

It is an object of the present invention to at least partially solve the problems in the conventional technology.

A projector-type vehicle lighting apparatus according to one aspect of the present invention includes a reflector having an elliptical reflection surface; a semiconductor light source including a light emitting unit arranged at or in a vicinity of a first focal point of the elliptical reflection surface; a projection lens having a horizontal optical axis; and a planar reflection surface that is arranged between the projection lens and a lens focal point of the projection lens in such a manner that the planar reflection surface intersects with the horizontal optical axis, the planar reflection surface reflecting a predetermined light distribution pattern toward the projection lens. The lens focal point exists as a pseudo lens focal point at a symmetric position with respect to the planar reflection surface. The pseudo lens focal point is located at or in a vicinity of a second focal point of the elliptical reflection surface. The horizontal optical axis exists as a vertical pseudo optical axis that intersects at right angles with the horizontal optical axis. The vertical pseudo optical axis coincides with an optical axis of the elliptical reflection surface. The projection lens projects the predetermined light distribution pattern reflected by the planar reflection surface to a predetermined direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 4:
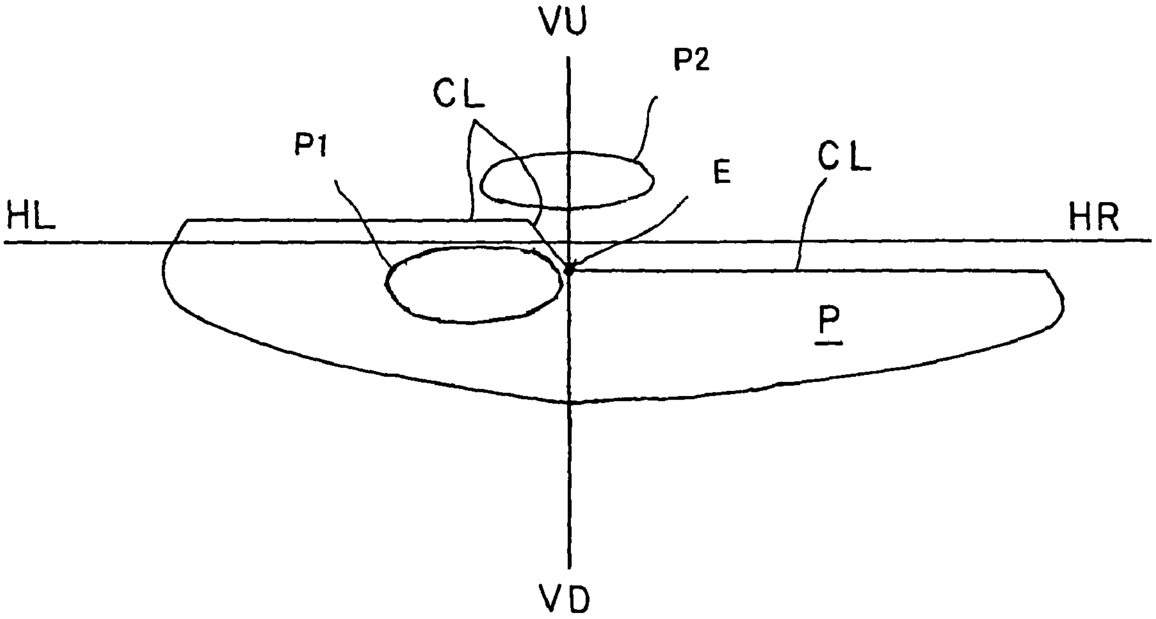
FIG. 4 is an explanatory view of a light distribution pattern obtained by the example shown in FIG. 1.

Exemplary embodiments of a vehicle lighting apparatus according to the present invention are explained in detail below with reference to the accompanying drawings. The present invention is not limited to the embodiments. The terms "front, rear, upper, lower, left, and right" mean "front, rear, upper, lower, left, and right" of a vehicle at the time when the vehicle lighting apparatus is mounted on the vehicle. In FIG. 4, a symbol "VU-VD" denotes a vertical line in the up and down direction with respect to a screen, and a symbol "HL-HR" denotes a horizontal line in the right and left direction with respect to the screen.

Figure 1:
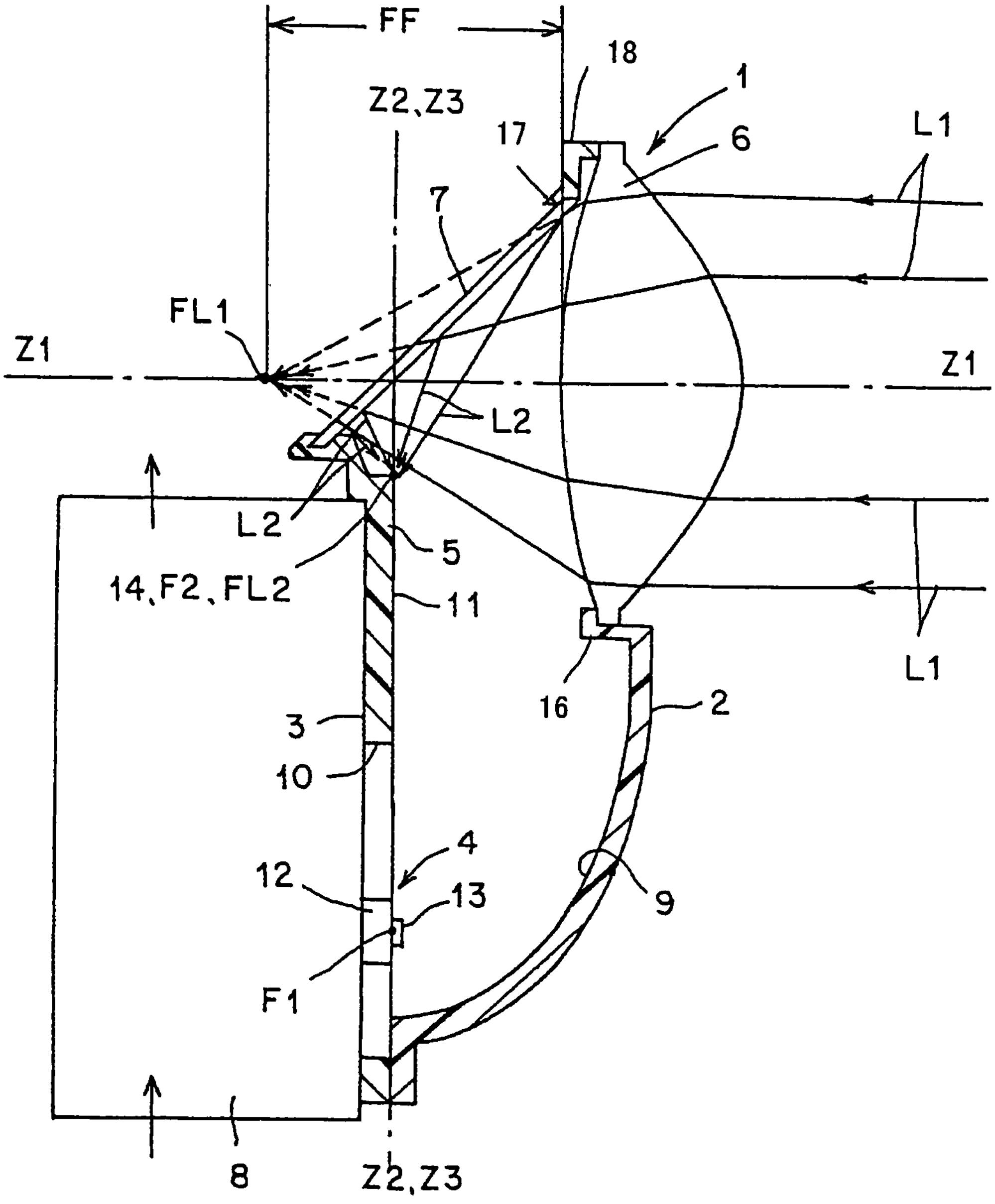
FIG. 1 is an explanatory view for explaining the operation principle of a vehicle lighting apparatus, showing an example of the vehicle lighting apparatus according to the present invention.

A configuration of the vehicle lighting apparatus according to an embodiment of the present invention is explained by taking a vehicle headlamp as an example. As shown in FIG. 1, a vehicle lighting apparatus 1 according to the embodiment is of a projector-type, having a unit structure. The vehicle lighting apparatus 1 includes a first reflector 2 (main reflector) on the front side, a second reflector 3 (sub-reflector, also used as a shade), a semiconductor light source 4, a shade 5, a projection lens (convex lens, condenser lens) 6, a planar reflection surface 7, a heat sink 8, and a lamp housing (not shown) and a lamp lens (not shown, for example, a plain outer lens) for the vehicle headlamp.

The first reflector 2, the second reflector 3, the semiconductor light source 4, the shade 5, the projection lens 6, the planar reflection surface 7, and the heat sink 8 constitute a lamp unit. One or a plurality of lamp units are arranged in a lamp room defined by the lamp housing and the lamp lens for the vehicle headlamp via, for example, a light axis adjusting mechanism (not shown).

The first reflector 2 and the second reflector 3 are formed of a light non-transmitting resin material, and used as a holding member such as a casing, housing, and holder. Also, the first reflector 2 and the second reflector 3 are parts formed by being divided into two pieces in the front and rear direction vertically along a vertical (including substantially vertical, hereinafter the same holds true) light axis Z2-Z2 of a first reflection surface 9, described later. The first reflector 2 and the second reflector 3 are fixed integrally to each other by a fixing means, not shown (for example, bolts and nuts, screws, staking, or clips). The first reflector 2 and the second reflector 3 may be formed integrally.

For the first reflector 2, a portion thereof from the upper side to the rear side is open, and a portion thereof from the front side to the lower side and portions on both right and left sides are closed. A front edge 16 of an opening of the upper portion of the first reflector 2 is formed into a semicircular shape. The concave inner surface of the closed portion of the first reflector 2 is subjected to aluminum deposition, silver painting, or the like to provide the first reflection surface 9 serving as an elliptical reflection surface.

The first reflection surface 9 is an elliptical reflection surface, and consists of a reflection surface such as a free curved surface (NURBS curved surface) based on a spheroid or an ellipse. The free curved surface (NURBS curved surface) based on an ellipse consists of a surface in which the vertical cross section in FIG. 1 and FIG. 2 forms an ellipse and the horizontal (including substantially horizontal, hereinafter the same holds true) cross section, not shown, forms a parabola or a deformed parabola. The first reflection surface 9 has a first focal point F1, a second focal point F2, and the light axis Z2-Z2. The second focal point F2 is a focal point when the first reflection surface 9 is a spheroid, and is a focal line on a horizontal cross section, that is, a curved focal line such that both ends are located on the upside and the center is located on the lower side as viewed from the front when the first reflection surface 9 is a free curved surface (NURBS curved surface) based on an ellipse.

The second reflector 3 has a vertical plate shape that closes the opening of the rear part of the first reflector 2. On the upper side of the second reflector 3, a closing unit 17 that closes the opening of the upper portion of the first reflector 2 is provided integrally. For the closing unit 17, a portion thereof from the upper side to the lower side is open, and a portion thereof from the upper side to the rear side and portions on both right and left sides are closed. An edge 18 of an opening of the front portion of the closing unit 17 of the second reflector 3 is formed into a semicircular shape. The front edge 16 of the first reflector 2 and the edge 18 of the second reflector 3 are combined with each other to form a circular shape. In the central portion of the second reflector 3 from the lower half to the middle of the lower portion, an opening 10 is provided. The front surface of the second reflector 3 having a vertical plate shape is subjected to aluminum deposition, silver painting, or the like to provide a second reflection surface 11 forming a plane (including substantially planar surface, hereinafter the same holds true) extending along the light axis Z2-Z2 of the first reflection surface 9. The second reflection surface 11 is provided between the second focal point F2 of the first reflection surface 9 or the vicinity thereof and the semiconductor light source 4.

As the semiconductor light source 4, a self-emitting semiconductor light source such as an LED and an EL (organic EL) (LED in this example) is used. The semiconductor light source 4 includes a substrate 12, an emitter (not shown) of a minute rectangular (square) light source chip (semiconductor chip) fixed on one surface of the substrate 12, and a light transmitting unit 13 that covers the emitter. The emitter or the light transmitting unit 13 covering the emitter is a light emitting unit of the semiconductor light source 4.

The semiconductor light source 4 is attached to the heat sink 8 via the substrate 12 so that the surface of the substrate 12 is vertical. The heat sink 8 is attached to the second reflector 3. As a result, the semiconductor light source 4 is arranged in the opening 10 in the second reflector 3. The light emitting unit of the semiconductor light source 4 is located at the first focal point F1 of the first reflection surface 9 or in the vicinity thereof. The semiconductor light source 4 may be attached to the second reflector 3 so that the substrate 12 is brought into contact with the heat sink 8.

The shade 5 is provided integrally with the second reflector 3. Specifically, the shade 5 is also used as the second reflector 3 having a vertical plate shape. As a result, the shade 5 is provided with the second reflection surface 11. The shade 5 is arranged between the second focal point F2 of the first reflection surface 9 or the vicinity thereof and the semiconductor light source 4. Also, the shade 5 cuts off some of reflected rays L4 that are emitted from the semiconductor light source 4 and are reflected by the first reflection surface 9, and forms a predetermined light distribution pattern P having a cutoff line CL, for example, a light distribution pattern for passing, a light distribution pattern for expressway, etc. as shown in FIG. 4 by means of the remaining reflection rays L4.

The projection lens 6 is held at the front edge 16 of the first reflector 2 and the edge 18 of the second reflector 3 directly or via a ring-shaped holding member (not shown). The projection lens 6 is an aspherical convex lens. The front side (outer side) of the projection lens 6 forms a convex aspherical surface having a large curvature (small radius of curvature), and on the other hand, the rear side (the planar reflection surface 7 side) of the projection lens 6 forms a convex aspherical surface having a small curvature (large radius of curvature). Using the projection lens 6, the focal distance of the projection lens 6 is decreased, and accordingly the dimension in the horizontal lens light axis Z1-Z1 of the projection lens 6 of the vehicle lighting apparatus 1 according to this example is decreased. The rear side of the projection lens 6 may form a planar aspherical surface (planar surface).

The projection lens 6 has a lens focal point FL1 that is a front focal point (focal point on the planar reflection surface 7 side) located at the position of a front focus (front focal distance) FF from the projection lens 6, a rear focal point (focal point on the outer side) located at the position of a back focus (rear focal distance) from the projection lens 6, and the horizontal lens light axis Z1-Z1 that connects the lens focal point FL1 of the front focal point and the rear focal point (not shown) to each other. The vertical light axis Z2-Z2 of the first reflection surface 9 and the horizontal light axis Z1-Z1 of the projection lens 6 intersect at right angles (including substantially at right angles, hereinafter the same holds true). The lens focal point FL1 of the projection lens 6 is a meridional image surface that is a focal surface on the object space side. Since the light of the semiconductor light source 4 has no high heat, a resin-made lens can be used as the projection lens 6. In this example, the projection lens 6 uses acrylic resin. The projection lens 6 projects, to the front, the predetermined light distribution pattern P having the cutoff line that is reflected by the planar reflection surface 7 and predetermined auxiliary light distribution patterns P1 and P2 formed by reflected light from the second reflection surface 11.

At the second focal point F2 of the first reflection surface 9 of the shade 5 or in a portion in the vicinity thereof, an edge 14 that forms the cutoff line CL and an elbow point E of the predetermined light distribution pattern P is provided along the second focal point (focal line) F2 of the first reflection surface 9.

The planar reflection surface 7 is formed by being subjected to aluminum deposition, silver painting, or the like on the surface of a planar plate member. The planar reflection surface 7 is attached to the closing unit 17 of the second reflector 3. The planar reflection surface 7 consists of an element separate from the closing unit 17 of the second reflector 3, and forms a part of the closing unit 17 of the second reflector 3. The planar reflection surface 7 may be formed integrally with the closing unit 17 of the second reflector 3.

The planar reflection surface 7 is arranged between the projection lens 6 and the lens focal point FL1 of the projection lens 6 to intersect with the lens light axis Z1-Z1 at an angle of 45° (including approximately 45°) The planar reflection surface 7 reflects the predetermined light distribution pattern P having the cutoff line CL and the auxiliary light distribution patterns P1 and P2 to a side of the projection lens 6 side.

Figure 2:
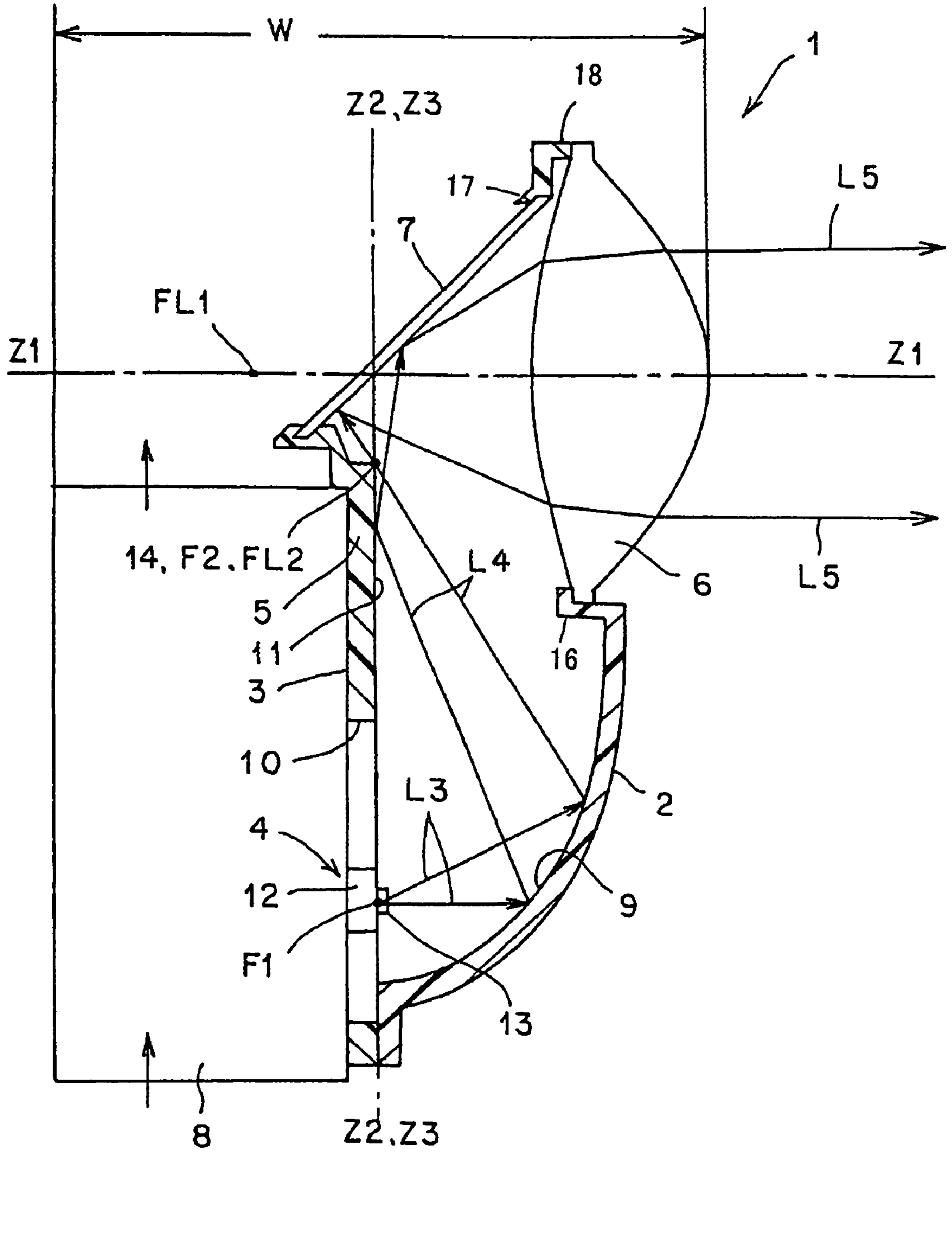
FIG. 2 is a longitudinal sectional view of a state in which a semiconductor light source is lighted to emit light in a vehicle lighting apparatus according to the present invention.
Figure 3:
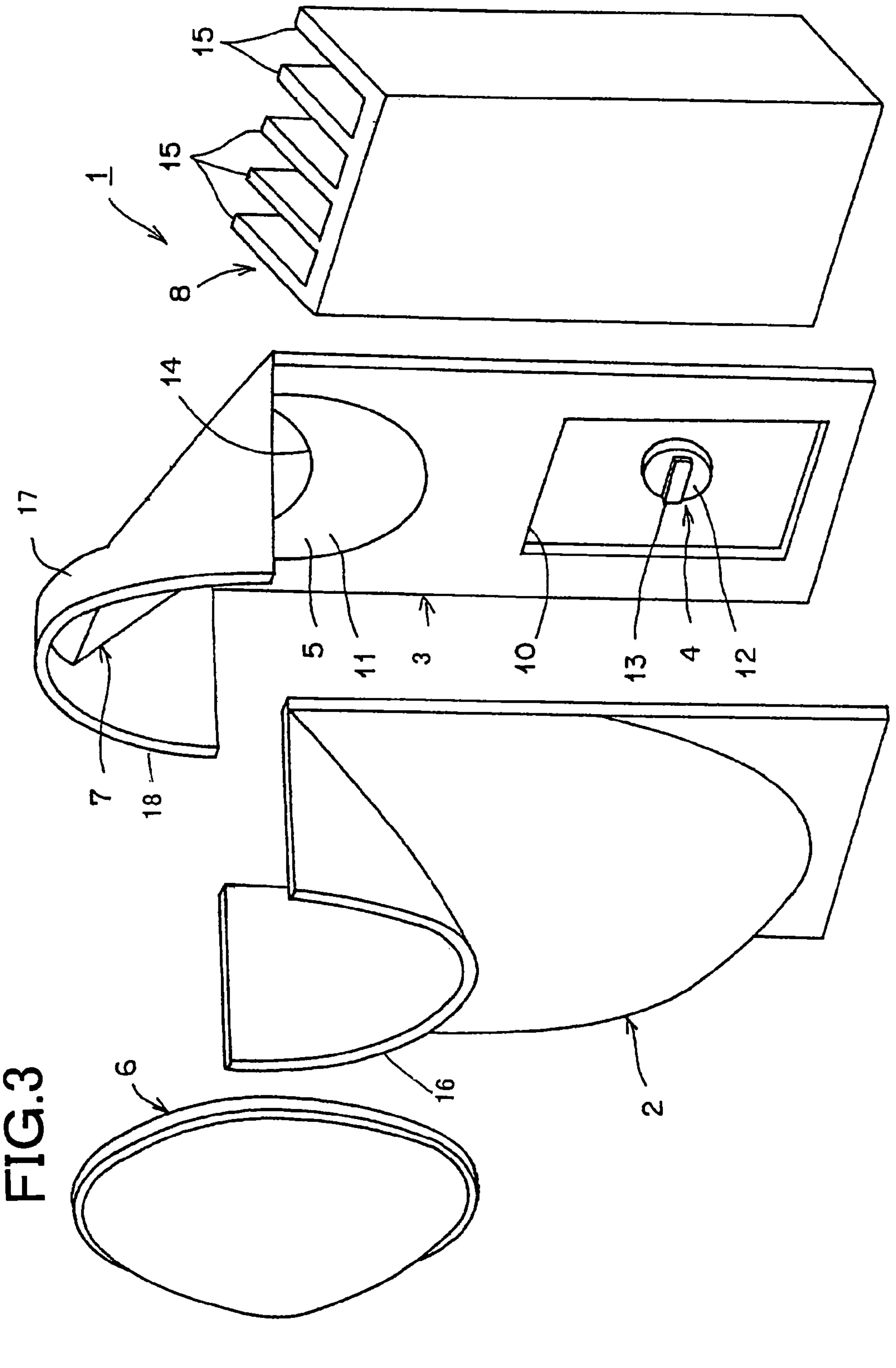
FIG. 3 is an exploded perspective view of principal parts of a vehicle lighting apparatus according to the present invention.

As shown in FIGS. 1 and 2, the lens focal point FL1 of the projection lens 6 exists as a pseudo lens focal point FL2 at a position symmetrical with respect to the planar reflection surface 7 by means of the planar reflection surface 7. The pseudo lens focal point FL2 is located at the second focal point F2 of the first reflection surface 9 or in the vicinity thereof. Similarly as shown in FIGS. 1 and 2, the horizontal lens light axis Z1-Z1 of the projection lens 6 exists as a vertical pseudo lens light axis Z3-Z3 that intersects at right angles with the horizontal lens light axis Z1-Z1 by means of the planar reflection surface 7. The vertical pseudo lens light axis Z3-Z3 coincides with (including substantially coincides with, hereinafter the same holds true) the light axis Z2-Z2 of the first reflection surface 9.

As a result, as shown in FIG. 1, when the parallel rays L1 of outside light come from the outside to the projection lens 6, passing through the projection lens 6, and go out of the projection lens 6, the rays L1 tend to focus at the lens focal point FL1 of the projection lens 6. The emitted rays from the projection lens 6, which tend to focus, are reflected by the planar reflection surface 7, and reflected rays L2 focus at the pseudo lens focal point FL2, that is, the second focal point F2 of the first reflection surface 9. Also, as shown in FIGS. 1 and 2, the horizontal lens light axis Z1-Z1 is made the vertical pseudo lens light axis Z3-Z3 bent through the right angles (including approximately right angles), that is, the light axis Z2-Z2 of the first reflection surface 9 by the planar reflection surface 7.

The heat sink 8 is configured so that a plurality of fins 15 are provided integrally in the vertical direction on the back surface of a planar plate with appropriate clearances being provided therebetween. On the surface of the planar plate of the heat sink 8, the semiconductor light source 4 is attached or makes contact via the substrate 12 so that the planar surface of the substrate 12 is vertical. The heat sink 8 is attached to the second reflector 3. As a result, the emitter, that is, the light emitting unit (the light transmitting unit 13) of the semiconductor light source 4 is located at the first focal point F1 or in the vicinity thereof.

The vehicle lighting apparatus 1 according to this example is configured as described above. Hereunder, the operation thereof is explained.

First, the emitter of the semiconductor light source 4 of the vehicle lighting apparatus 1 is lighted to emit light. Then, rays L3 are irradiated from the emitter of the semiconductor light source 4. The rays L3 are reflected by the first reflection surface 9, and the reflected rays L4 focus at the second focal point F2 of the first reflection surface 9 and the pseudo lens focal point FL2. Some of the reflected rays L4 that focus at the second focal point F2 and the pseudo lens focal point FL2 is cut off by the shade 5. The reflected rays L4 that are cut off by the shade 5 are reflected by the second reflection surface 11, which is integral with the shade 5, and are formed into the predetermined auxiliary light distribution patterns P1 and P2. On the other hand, the remaining reflected rays L4 form the predetermined light distribution pattern P having the cutoff line CL.

The predetermined auxiliary light distribution patterns P1 and P2 and the predetermined light distribution pattern P having the cutoff line CL pass through the projection lens 6 and are synthesized as a light reflected by the planar reflection surface 7 as if it is emitted from the lens focal point FL1 of the projection lens 6, and are projected to the automobile (vehicle) front as a predetermined light distribution pattern (rays L5 projected from the projection lens 6) to illuminate a road surface and the like.

Also, when heat is generated from the semiconductor light source 4 by the lighting and light emitting of the emitter of the semiconductor light source 4, the heat is transmitted to the heat sink 8, and is dissipated to the outside air (outside) via the heat sink 8.

The vehicle lighting apparatus 1 according to this example has the configuration and operation as described above. Hereunder, the effects thereof are explained.

The vehicle lighting apparatus 1 according to this example is configured so that the planar reflection surface 7 is arranged between the projection lens 6 and the lens focal point FL1 of the projection lens 6 to intersect with the lens light axis Z1-Z1 of the projection lens 6. As a result, for the vehicle lighting apparatus 1 according to this example, the lens focal point FL1 of the projection lens 6 exists as the pseudo lens focal point FL2 at the position symmetrical with respect to the planar reflection surface 7 by means of the planar reflection surface 7, and the pseudo lens focal point FL2 is located at the second focal point F2 of the first reflection surface 9 based on an ellipse or in the vicinity thereof. Also, the horizontal lens light axis Z1-Z1 of the projection lens 6 exists as the vertical pseudo lens light axis Z3-Z3 that intersects at right angles with the horizontal lens light axis Z1-Z1 by means of the planar reflection surface 7, and the vertical pseudo lens light axis Z3-Z3 coincides with the light axis Z2-Z2 of the first reflection surface 9. Thereby, for the vehicle lighting apparatus 1 according to this example, the projection lens 6 and the planar reflection surface 7 are arranged in the horizontal direction, and also the projection lens 6 and the planar reflection surface 7, the first reflector 2 and the second reflector 3, and the semiconductor light source 4 and the shade 5 can be arranged in the vertical direction. Therefore, the depth dimension W in the horizontal direction can be decreased, so that the vehicle lighting apparatus 1 according to this example can meet the need for decreasing the depth dimension W in the horizontal direction. Also, the vertical dimension in the vertical direction can also be decreased.

Also, for the vehicle lighting apparatus 1 according to this example, the semiconductor light source 4 is attached to or brought into contact with the heat sink 8 via the substrate 12 of the semiconductor light source 4 so that the planar surface of the substrate 12 is vertical, and the heat sink 8 is disposed vertically. As a result, for the vehicle lighting apparatus 1 according to this example, since the semiconductor light source 4 and the heat sink 8 are arranged horizontally, the heat generated in the semiconductor light source 4 can be dissipated efficiently via the heat sink 8 disposed vertically. Moreover, for the vehicle lighting apparatus 1 according to this example, since the first reflector 2, the second reflector 3, the semiconductor light source 4, the shade 5, the projection lens 6, the planar reflection surface 7, and the heat sink 8 can be arranged horizontally, the upper portion of the heat sink 8 can be opened to the outside air. Thereby, for the vehicle lighting apparatus 1 according to this example, the heat of the semiconductor light source 4 can be dissipated more efficiently to the outside air from the downside to the upside as indicated by the solid-line arrow marks in FIGS. 1 and 2.

Further, for the vehicle lighting apparatus 1 according to this example, some of the reflected rays L4 that are emitted from the semiconductor light source 4 and reflected by the first reflection surface 9 is cut off by the shade 5 that is arranged between the second focal point F2 of the first reflection surface 9 or the vicinity thereof and the semiconductor light source 4, and the remaining reflected rays L4 can form the predetermined light distribution pattern P having the cutoff line CL. Moreover, for the vehicle lighting apparatus 1 according to this example, by the second reflection surface 11 that is provided on the shade 5 and has a planar surface extending along the light axis Z2-Z2 of the first reflection surface 9, the reflected rays L4 that are cut off by the shade 5 are reflected, and can be formed into the predetermined auxiliary light distribution patterns P1 and P2. Therefore, the light from the semiconductor light source 4 can be utilized effectively.

Still further, for the vehicle lighting apparatus 1 according to this example, both sides of the projection lens 6 have a convex aspherical surface, so that the focal distance of the projection lens 6 is short, and accordingly the horizontal dimension in the lens light axis Z1-Z1 direction of the projection lens 6 is decreased.

In the above-described example, the vehicle headlamp is explained as the vehicle lighting apparatus. In the present invention, however, the vehicle lighting apparatus may be any lighting apparatus other than the vehicle headlamp, such as a tail lamp and a brake lamp of rear combination lamp, a tail/brake lamp, and a backup lamp.

Also, in the above-described example, an example having the first reflection surface 9 and the second reflection surface 11 is explained. In the present invention, however, the vehicle lighting apparatus may have the first reflection surface only.

Further, in the above-described example, the predetermined light distribution pattern P having the cutoff line CL and the auxiliary light distribution patterns P1 and P2 are irradiated. In the present invention, however, the predetermined light distribution pattern may be a light distribution pattern having no cutoff line, such as a light distribution pattern for fog lamp, a light distribution pattern for wet road, a light distribution pattern for daytime lamp, a light distribution pattern for tail lamp, a light distribution pattern for brake lamp, a light distribution pattern for tail/brake lamp, and a light distribution pattern for backup lamp.

Still further, in the above-described example, the auxiliary light distribution pattern consists of the auxiliary light distribution pattern P1 that forms a hot zone, which is irradiated to the vicinity of the slantwise cutoff line CL, the upper horizontal cutoff line, and the elbow point E of the predetermined light distribution pattern P, and the auxiliary light distribution pattern P2 for overhead sign, which is irradiated to above the cutoff line CL of the predetermined light distribution pattern P. In the present invention, however, the auxiliary light distribution pattern may be an auxiliary light distribution pattern other than the auxiliary light distribution pattern that forms a hot zone and the auxiliary light distribution pattern for overhead sign. Moreover, the auxiliary light distribution pattern may be one that can provide at least either one of the auxiliary light distribution pattern that forms a hot zone and the auxiliary light distribution pattern for overhead sign.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projector-type vehicle lighting apparatus comprising:

a reflector having an elliptical reflection surface;

a semiconductor light source including a light emitting unit arranged at or in a vicinity of a first focal point of the elliptical reflection surface;

a second reflector including a second reflection surface, and a vertical plate portion including an opening to accommodate the semiconductor light source;

a heat sink being configured so that a plurality of fins are provided integrally to extend in a vertical direction with respect to a back surface of a planar plate and in a direction parallel to an up-and-down direction with appropriate clearances being provided therebetween;

a projection lens having a horizontal optical axis; and a planar reflection surface that is arranged between the projection lens and a lens focal point of the projection lens in such a manner that the planar reflection surface intersects with the horizontal optical axis, the planar reflection surface reflecting a predetermined light distribution pattern toward the projection lens, wherein the lens focal point exists as a pseudo lens focal point at a symmetric position with respect to the planar reflection surface, the pseudo lens focal point is located at or in a vicinity of a second focal point of the elliptical reflection surface, the horizontal optical axis is bent at the planar reflection surface to coincide with a vertical pseudo optical axis that intersects at right angles with the horizontal optical axis, the vertical pseudo optical axis coincides with an optical axis of the elliptical reflection surface, and the projection lens projects the predetermined light distribution pattern reflected by the planar reflection surface to a predetermined direction, wherein the semiconductor light source is attached to the heat sink via a substrate of the semiconductor light source in such a manner that a surface of the substrate is in the vertical direction, and the heat sink is arranged in the vertical direction.

2. The vehicle lighting apparatus according to claim 1, further comprising:

a shade that is arranged, taking the elliptical reflection surface as a first reflection surface, between a second focal point of the first reflection surface or a vicinity of the second focal point and the semiconductor light source, the shade cutting off a portion of a reflected light that is emitted from the semiconductor light source and reflected by the first reflection surface and forming the predetermined light distribution pattern having a cutoff line with a remaining of the reflected light, wherein the shade includes a second reflection surface that forms a planar surface along the optical axis of the first reflection surface, and reflects the reflected light cut off by the shade to form a predetermined auxiliary light distribution pattern.

3. The vehicle lighting apparatus according to claim 1, wherein the projection lens is an aspherical convex lens, a front side of the projection lens forms a convex aspherical surface having a large curvature, and a rear side of the projection lens forms a convex aspherical surface having a small curvature.

* * * * *